US009800918B2

(12) United States Patent
Cho et al.

(10) Patent No.: US 9,800,918 B2
(45) Date of Patent: Oct. 24, 2017

(54) VIDEO RECORDING SYSTEM, AND METHOD AND APPARATUS FOR PROCESSING IMAGE IN HOST SYSTEM

(71) Applicant: HANWHA TECHWIN CO., LTD., Changwon-si (KR)

(72) Inventors: Sung Bong Cho, Changwon-si (KR); Ju Wan Koo, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 5 days.

(21) Appl. No.: 14/330,466

(22) Filed: Jul. 14, 2014

(65) Prior Publication Data
US 2015/0131962 A1    May 14, 2015

(30) Foreign Application Priority Data

Nov. 14, 2013   (KR) .................. 10-2013-0138362

(51) Int. Cl.
*H04N 5/77*        (2006.01)
*H04N 21/2743*     (2011.01)
*H04N 5/765*       (2006.01)

(52) U.S. Cl.
CPC ......... *H04N 21/2743* (2013.01); *H04N 5/772* (2013.01); *H04N 5/765* (2013.01)

(58) Field of Classification Search
CPC .. H04N 21/4325; H04N 19/42; H04N 5/2258; G06F 13/24; G06F 13/4221
See application file for complete search history.

(56) References Cited

U.S. PATENT DOCUMENTS

| | | | |
|---|---|---|---|
| 5,856,975 A | 1/1999 | Rostoker et al. | |
| 2001/0008574 A1* | 7/2001 | Miyashita | G11B 27/007 386/241 |
| 2006/0200573 A1* | 9/2006 | Lin | G06F 1/3203 709/231 |
| 2008/0098081 A1* | 4/2008 | Noda | H04L 65/4092 709/208 |
| 2008/0201515 A1* | 8/2008 | Birgin | G06F 13/409 710/313 |
| 2008/0260296 A1* | 10/2008 | Chung | G06T 1/20 382/307 |
| 2008/0291323 A1* | 11/2008 | Higuchi | H04N 7/012 348/448 |
| 2010/0111489 A1* | 5/2010 | Presler | H04N 5/225 386/278 |

(Continued)

FOREIGN PATENT DOCUMENTS

KR    20-0311055 Y1    4/2003
KR    10-2004-0086931 A    10/2004
(Continued)

*Primary Examiner* — Hung Dang
*Assistant Examiner* — Sunghyoun Park
(74) *Attorney, Agent, or Firm* — Sughrue Mion, PLLC (57) ABSTRACT

Provided is a video recording system. The video recording system includes a camera configured to obtain an image signal, a host system configured to obtain the image signal from the camera and support a serial bus protocol, a sub-system including a serial bus interface unit configured to transmit or receive data to or from the host system, and a storage device configured to receive the image signal from the host system and record the received image signal.

12 Claims, 5 Drawing Sheets

(56) References Cited

U.S. PATENT DOCUMENTS

| | | | |
|---|---|---|---|
| 2010/0146292 A1* | 6/2010 | Shi | H04L 9/321 713/189 |
| 2011/0029691 A1* | 2/2011 | Scorsi | G06F 13/4022 710/8 |
| 2011/0113219 A1* | 5/2011 | Golshan | G06F 9/44505 712/30 |
| 2011/0164046 A1* | 7/2011 | Niederauer | G06F 1/3218 345/503 |
| 2011/0211036 A1* | 9/2011 | Tran | H04N 5/23238 348/14.08 |
| 2012/0113265 A1* | 5/2012 | Galvin | H04N 5/23206 348/159 |
| 2013/0176459 A1* | 7/2013 | Yang | H04N 5/232 348/231.99 |
| 2013/0278775 A1* | 10/2013 | Doddapuneni | H04N 19/00903 348/159 |
| 2014/0085399 A1* | 3/2014 | Modai | H04L 65/403 348/14.01 |

FOREIGN PATENT DOCUMENTS

| | | |
|---|---|---|
| KR | 1-0067733 A | 6/2011 |
| KR | 10-2013-0027275 A | 3/2013 |

\* cited by examiner

VIDEO RECORDING SYSTEM, AND METHOD AND APPARATUS FOR PROCESSING IMAGE IN HOST SYSTEM

CROSS-REFERENCE TO RELATED APPLICATION

This application claims the benefit of Korean Patent Application No. 10-2013-0138362, filed on Nov. 14, 2013, in the Korean Intellectual Property Office, the disclosure of which is incorporated herein in its entirety by reference.

BACKGROUND

1. Field

One or more exemplary embodiments of the present disclosure relate to a video recording system, and a method and apparatus for processing images in a host system.

2. Description of the Related Art

A video recording system records images obtained by a camera, and displays the images or transmits the images to a client. Recently, as the resolution of images obtained by a camera has increased and the image processing load has increased due to an increase of various user needs, the load of a host system which manages the overall data processing of the video recording system has increased. Hence, there is a need for distributing the load.

SUMMARY

One or more exemplary embodiments of the present disclosure provide a video recording system, and a method and apparatus for processing an image in a host system.

Additional aspects will be set forth in part in the description which follows and, in part, will be apparent from the description, or may be learned by practice of the presented exemplary embodiments.

According to one or more exemplary embodiments, there is provided a video recording system including: a camera configured to obtain an image signal; a host system configured to obtain the image signal from the camera and support a serial bus protocol; a sub-system including a serial bus interface unit configured to transmit or receive data to or from the host system; and a storage device configured to receive the image signal from the host system and record the received image signal.

The serial bus may be a PCI express (PCIe) serial bus.

The video recording system may further include: a display device configured to display an image, wherein the sub-system may include a first sub-system configured to receive the image signal from the host system, decode the image signal, and transmit the decoded image signal to the display device.

The first sub-system may be configured to transmit at least part of the decoded image signal to the host system.

The host system may be configured to store the decoded image signal in the storage device or may transmit the decoded image signal to the sub-system.

The sub-system may include a second sub-system configured to receive the image signal from the host system, analyze the image signal, and generate analysis data for the image signal.

The second sub-system may be further configured to detect an event related to the image signal and generate the event information according to the detection of the event.

The video recording system may further include a client connected to the host system through a network, wherein the host system may be configured to transmit an image signal received from the camera or an image signal recorded in the storage device to the client.

The host system may include a storage management unit configured to read data from the storage device or record data to the storage device according to a command of the host system.

When data is recorded in the storage device, the storage management unit may be configured to generate metadata for the data and record the metadata in the storage device.

According to another aspect of an exemplary embodiment, there is provided a method of processing an image in a host system, including: obtaining an image signal from a camera; transmitting the image signal to a plurality of sub-systems based on a serial bus protocol; and recording the image signal in a storage device, wherein each of the sub-systems includes a serial bus interface unit configured to transmit or receive data to or from the host system.

The serial bus may be a peripheral component interconnect express (PCIe).

The method may further include: receiving, by a first sub-system, the image signal from the host system; decoding the image signal; and outputting the decoded image signal to a display device.

The method may further include receiving at least part of the decoded image signal from the first sub-system.

The method may further include storing an image signal received from the first sub-system in the storage device or transmitting the image signal to at least one of the plurality of sub-systems.

The transmitting may further include transmitting the image signal to a second sub-system which receives the image signal from the host system, analyzes the image signal, and generates analysis data for the image signal.

The second sub-system may detect an event related to the image signal and generate event information according to the detecting of the event.

The method may further include transmitting the image signal obtained from the camera or the image signal recorded in the storage device to a client through a network.

The recording may include: reading data from the storage device or writing data to the storage device; and generating metadata for the data and recording the metadata in the storage device according to whether data is recorded in the storage device according to a command.

According to another aspect of an exemplary embodiment, there is provided a host device of a video recording system including: an image receiver configured to receive an image signal from a camera; a sub-system manager configured to transmit the image signal to a sub-system based on a serial bus protocol; a storage manager configured to record the image signal in a storage; a client manager configured to transmit the image signal to a client through a network; and a controller configured to control the image receiver, the sub-system manager, the storage manager, and the client manager.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the exemplary embodiments. Expressions such as "at least one of," when preceding a list of elements, modify the entire list of elements and do not modify the individual elements of the list.

In the exemplary embodiments described below, terms such as "first" and "second" are not intended to limit the scope of the exemplary embodiments, but are intended to distinguish one component from another.

In the exemplary embodiments described below, a singular expression includes a plural expression unless clearly stated otherwise.

In the exemplary embodiments described below, terms such as "include" and "have" do not exclude the possibility of adding one or more other characteristics or features.

Figure 1:
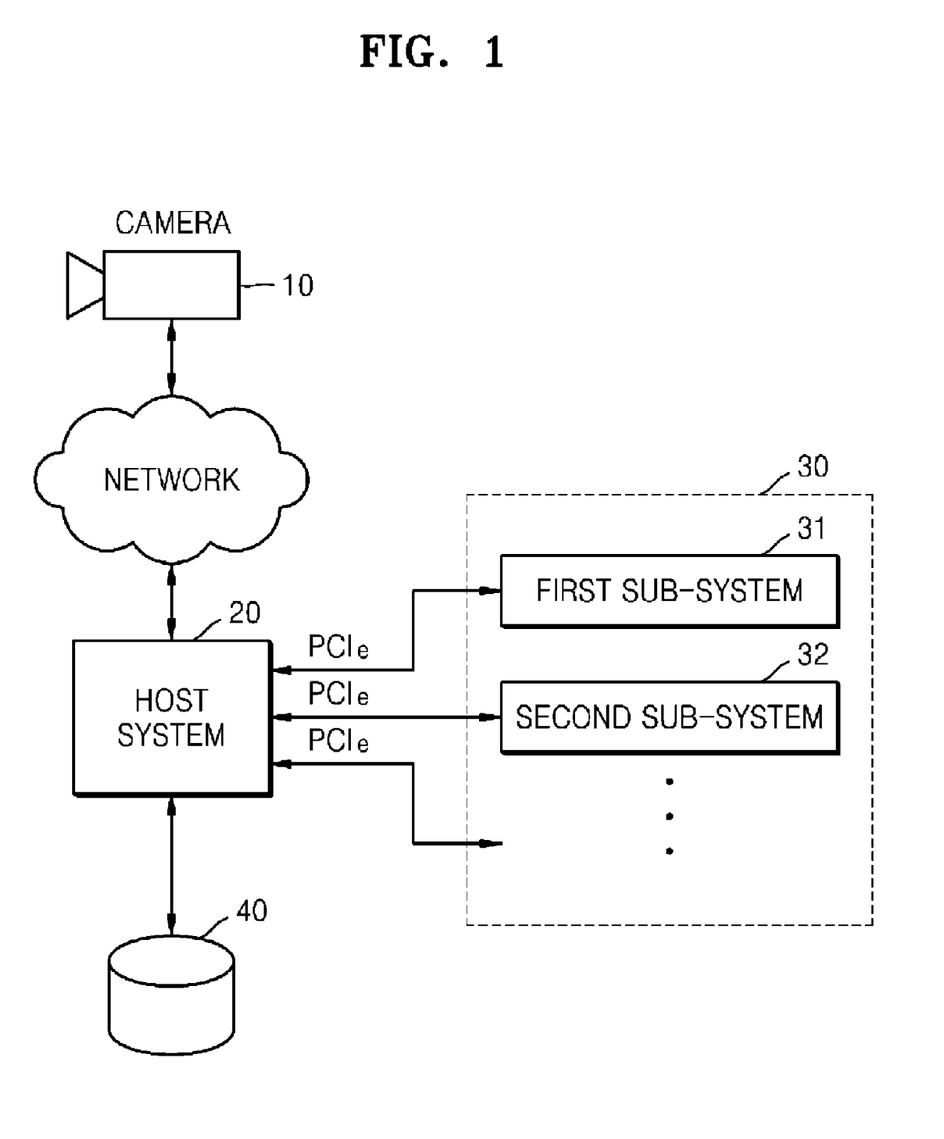
FIG. 1 schematically illustrates a video recording system according to an exemplary embodiment.

FIG. 1 schematically illustrates a video recording system according to an exemplary embodiment. Referring to FIG. 1, the video recording system includes a camera 10, a host system 20, a sub-system 30, and a storage device 40. The video recording system illustrated in FIG. 1 illustrates only components related to the present exemplary embodiment in order to prevent ambiguity of the characteristics of the present exemplary embodiment. Hence, it would be easily understood by those of ordinary skill in the art that other general-purpose components may be further included in addition to the components illustrated in FIG. 1.

The camera 10 obtains an image which is generated by detecting an image of a monitoring area. The camera 10 encodes the obtained image and transmits the encoded image to the host system 20. The camera 10 may obtain an audio signal along with the image and generate metadata. The camera 10 may transmit the image, audio, and metadata to the host system 20. FIG. 1 illustrates one camera 10, but the video recording system may include a plurality of cameras 10. The detailed configuration of the camera 10 is described with reference to FIG. 3.

The host system 20 obtains an image signal from the camera 10. According to an example, the host system 20 may obtain an image signal from the camera 10 through the network depending on the application. According to another example, the host system 20 obtains the image signal from the camera 10 through a serial bus. Furthermore, according to another example, the host system 20 may obtain the image signal from the camera 10 through a wired connection, e.g., via a cable. In the present exemplary embodiment, the method of obtaining the image signal by the host system 20 is not limited to the above examples.

The host system may include a central processing unit (CPU). The host system 20 supports a serial bus protocol. The serial bus protocol includes a peripheral component interconnect express (also referred to as PCI express, or PCIe). The host system 20 manages transmission and reception between a camera 10, a sub-system 30, and a storage device 40. The PCIe protocol is a high-speed serial bus standard, and uses differential signals of 2.5 Gbps and supports various speeds up to 80 Gbps or greater.

The video recording system according to an exemplary embodiment may be a loosely-coupled system. In the present exemplary embodiment, the host system 20 and the sub-system 30 may respectively have independent operating systems, and the processors respectively included in each of the host system 20 and the sub-system 30 may independently operate. As such, the host system 20 may distribute the data processing load to the sub-system 30.

The host system 20 supports a serial bus protocol when transmitting and receiving data to and from the sub-system 30. For example, the host system 20 transmits and receives data to and from the sub-system 30 on the basis of the PCI expression (PCIe) protocol. The host system 20 may support a serial bus protocol when transmitting and receiving data to and from the storage device 40. For example, the host system 20 may transmit and receive data to and from the storage device 30 on the basis of the PCI express (PCIe) protocol.

The video recording system includes at least one sub-system 30. For example, the video-recording system includes a first sub-system 31 and a second sub-system 32. Each sub-system 30 includes a serial bus interface unit (e.g., serial bus interface) which receives data from the host system 20 or transmits data to the host system 20. The serial bus interface unit enables the format of the data processed in each sub-system 30 to be compatible with the serial bus protocol. The serial bus interface unit may be a PCI express (PCIe) interface which supports the PCI expression protocol.

Each sub-system 30 receives an image signal from the host system 20 and processes the image signal. Each sub-system 30 may correspond to at least one processor and may have at least one processor. Each sub-system 30 may process the image signal using different methods. Each sub-system 30 may be included in another hardware device such as a microprocessor and a general-purpose computer system.

Each sub-system 30 may be implemented using a digital signal processor (DSP), an application specific integrated circuit (ASIC) which is designed and manufactured to have a specific function, and a system on chip (SoC). Each sub-system 30 is loosely coupled with the host system.

The storage device 40 receives an image signal from the host system 20 and also writes an image signal. For example, the host system 20 transmits an image signal obtained from the camera 10 to the storage device 40, and the storage device 40 stores the image signal. At this time, the image signal may be stored in the storage device 40 in a state which is encoded by the camera 10. In the present exemplary embodiment, the host system 20 may further obtain an audio signal and metadata from the camera 10 and transmit the audio signal and the metadata to the storage device 40, and the storage device 40 may store the audio signal, the image signal, and the metadata.

According to another exemplary embodiment, the host system 20 may store data obtained from the sub-system 30 in the storage device 40. The data obtained from the sub-system 30 may be, for example, an image signal in a decoded state. The host system may obtain the decoded image signal from the sub-system 30 and transmit the image signal to the storage device 40. The storage device 40 may receive and store the decoded image signal.

The data obtained from the sub-system 30 may further include an audio signal and metadata. The storage device 40 may store a decoded image signal, an audio signal, and metadata.

Figure 2:
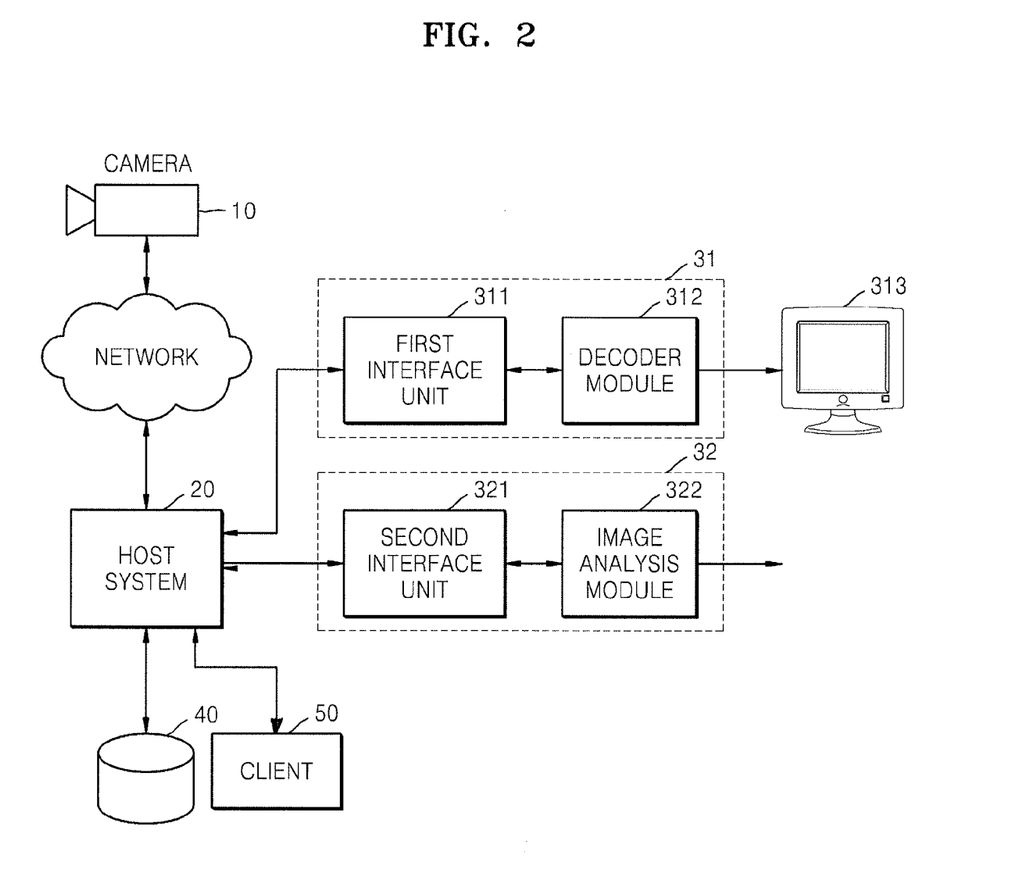
FIG. 2 schematically illustrates a video recording system according to another exemplary embodiment.

FIG. 2 schematically illustrates a video recording system according to another exemplary embodiment. With respect to the configuration of FIG. 2, the elements shown in FIG. 2 having the same reference characters as the elements of FIG. 1 may be the same elements. Hereinafter, when describing each component of FIG. 2, the components which have already been described with reference to FIG. 1, will not be described. Referring to FIG. 2, the host system 20 manages data transmission and reception between the camera 10, the sub-system 30, the storage device 40, and the client 50.

Referring to FIG. 2, the video recording system further includes the client 50. The client 50 is connected to the host system 20 and may transmit and receive data to and from the host system 20. For example, the host system 20 may transmit an image signal received from the camera 10 to the client 50. The host system 20 may read data stored in the storage device 40 and transmit the read data to the client 50. The host system 20 may transmit data obtained from the sub-system 30, for example, a decoded image signal, to the client 50. The data transmitted between the host system 20 and the client 50 may include an audio signal and metadata.

The client 50 may transmit a data transmission request message, etc. to the host system 20. The data which is transmitted and received between the host system 20 and the client 50 is not limited to the above example. According to an example, the client 50 may be connected to the host system 20 through a network (e.g., LAN, the Internet, etc.).

Referring to FIG. 2, the image recording system according to an exemplary embodiment includes a first sub-system 31 and a second sub-system 32. The first sub-system 31 includes a first interface unit 311 and a decoder module 312. The second sub-system 32 includes a second interface unit 321 and an image analysis module 322. The image recording system according to an exemplary embodiment includes a display device which displays an image. The modules 312 and 322 included in each sub-system may correspond to at least one processor or may include at least one processor. For example, the modules 312 and 322 included in each sub-system may include a central processing unit (CPU).

Referring to FIG. 2, the first sub-system 31 according to an exemplary embodiment may be a decoding system. The first sub-system 31 according to the present exemplary embodiment receives an image signal from the host system 20, decodes the image signal, and transmits the decoded image signal to the display device 313. In detail, the first interface unit 311 receives an image signal from the host system 20 on the basis of the PCI express (PCIe), converts the image signal into a signal of a format which may be processed in the decoder module 312, and outputs the converted signal to the decoder module 312. The image signal received by the first interface unit 311 may be an encoded image signal. The decoder module 312 decodes an obtained image signal and transmits the decoded image signal to the display device 313. The display device 313 displays an image using the decoded image signal.

According to an example of the present exemplary embodiment, the first sub-system 31 may transmit at least a part of the decoded image signal to the host system 20. For example, the decoder module 312 may output at least a part of the decoded image signal to the first interface unit 311. The first interface unit 311 may then transmit the obtained image signal to the host system 20. According to this example, the host system 20 may obtain the decoded image signal through the sub-system 31 without directly decoding the image signal.

For example, the first sub-system 31 may transmit at least some frames of the decoded image signal, e.g., a still image, to the host system. Furthermore, the first sub-system 31 may transmit the decoded image signal to the host system 20, and the host system 20 may obtain at least some frames of the decoded image signal, e.g., a still image. The host system 20 may obtain a still image through the first sub-system 31 without directly decoding the encoded image signal obtained from the camera 10.

The host system 20 may store the decoded image signal obtained from the first sub-system 31 or transmit the decoded image signal to the client 50. The host system 20 may transmit the decoded image signal obtained from the first sub-system 31 to another sub-system connected to the host system 20. The host system 20 may obtain the decoded image signal from the first sub-system 31 without directly decoding the encoded image signal, and may transmit the decoded image signal to another peripheral device connected to the host system 20.

Referring to FIG. 2, the second sub-system 32 according to an exemplary embodiment may be an image analysis system. The second sub-system 32 receives an image signal from the host system 20, and generates analysis data for the image signal by analyzing the image signal. In detail, the second interface unit 321 receives an image signal from the host system 20 on the basis of the PCI expression (PCIe), converts the image signal into a signal of a format which may be processed in the image analysis module 322, and outputs the converted signal to the image analysis module 322. The image analysis module 322 analyzes the image signal so as to generate analysis data for the image signal.

According to an example of the present exemplary embodiment, the image signal received by the second interface unit 321 may be an encoded image signal. In this case, the image analysis module 322 may decode the image signal when the decoded signal is needed for the analysis of the image signal. According to another example of the present exemplary embodiment, the image signal received by the second interface unit 321 may be a decoded image signal.

According to an example, the image analysis module 322 may extract predetermined information from the image signal. For example, the image analysis module 322 may detect an event from the image signal and generate event information. Furthermore, the image analysis module 322 may perform image processing operations, such as, for example, extracting the feature value of the image signal or detecting movements of a moving object within the image.

According to another example, the second sub-system 32 may further receive an audio signal and metadata as well as the image signal from the host system 20. The image analysis module 322 may extract predetermined information from the audio signal. For example, the image analysis module 322 may detect an event from the audio signal and generate event information.

In addition, another sub-system may be further connected to the host system 20. For example, a sub-system which obtains the decoded image signal from the host system 20, and encodes the image signal and outputs the encoded image signal, may be further connected. Many different combinations of sub-systems may be implemented according to exemplary embodiments.

The sub-systems connected to the host system 20 may be removed from the video recording system as the connection with the host system 20 is cancelled. Furthermore, when a new sub-system is connected to the host system 20, the new sub-system may be added to the video recording system. The new sub-system may communicate with the host system 20 on the basis of a serial bus. The sub-system transmits and receives data to and from the host system 20 on the basis of the PCI express (PCIe).

The video recording system of the present exemplary embodiment may be extended as a new sub-system is connected to the host system 20 via a serial bus as described above.

Figure 3:
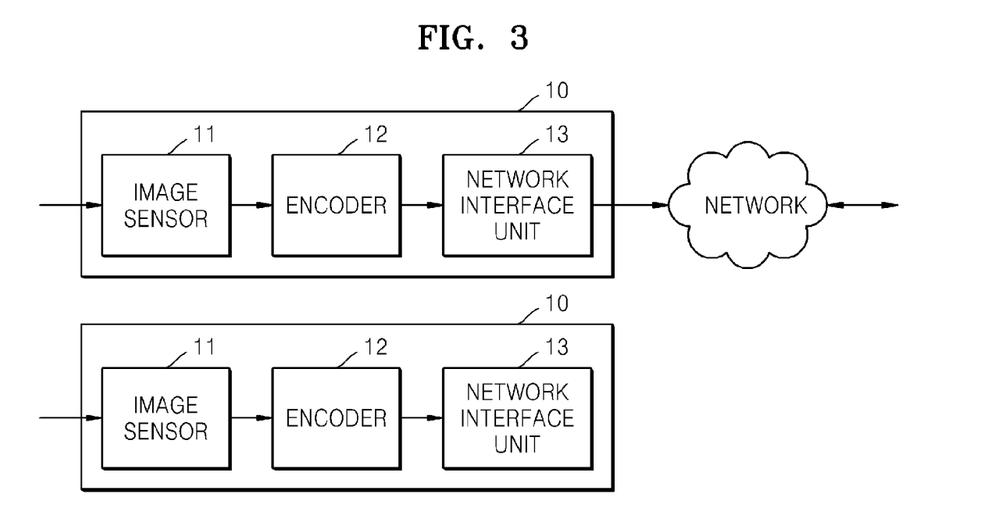
FIG. 3 schematically illustrates a configuration of a camera according to an exemplary embodiment.

FIG. 3 schematically illustrates a configuration of a camera according to an exemplary embodiment. Referring to FIG. 3, a plurality of cameras 10 may be provided. The camera 10 may be a network camera which transmits an image signal through a network. Each camera 10 includes an image sensor 11, an encoder 12, and a network interface unit 13.

The image sensor 11 converts a light signal incoming through a lens into an electric signal. The encoder 12 converts a signal converted by the image sensor into an image signal, and encodes the image signal. The network interface unit 13 transmits the encoded image signal to the host system through a network.

The image signal obtained in each camera 10 may be transmitted to the host system through a network, and each camera 10 may independently operate.

Figure 4:
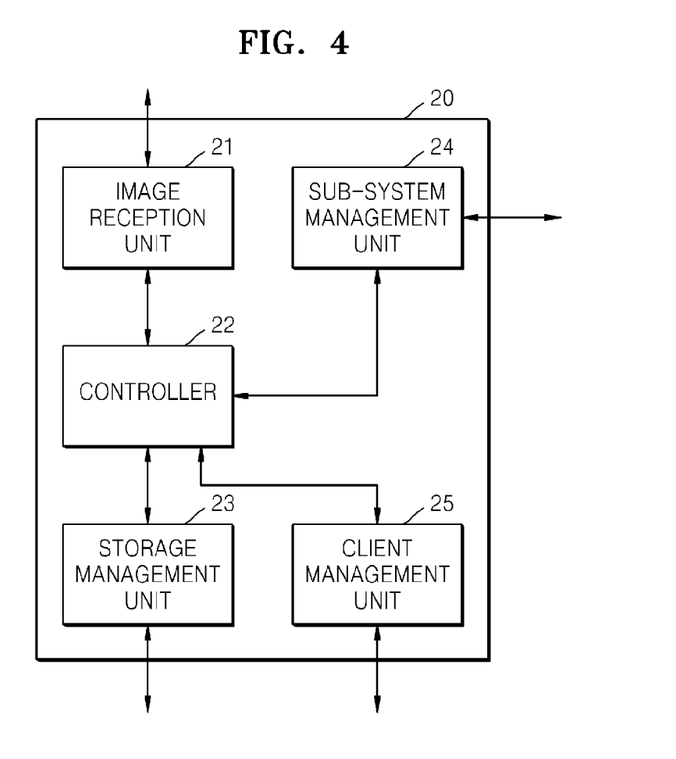
FIG. 4 specifically illustrates a host system of FIG. 1, according to an exemplary embodiment.

FIG. 4 specifically illustrates the host system 20 of FIG. 1, according to an exemplary embodiment. Referring to FIG. 4, the host system 20 includes an image reception unit 21 (e.g., image receiver), a controller 22, a storage management unit 23 (e.g., storage manager), a sub-system management unit 24 (e.g., sub-system manager), and a client management unit 25 (e.g., client manager).

The image reception unit 21 receives an image signal from the camera 10. The controller 22 controls reception of the image signal by the image reception unit 21. The image reception unit 21 receives the image signal from the camera 10 according to control of the controller 22, or transmits a control command to the camera 10.

According to an example of the present exemplary embodiment, the image reception unit 21 may receive an image signal from the camera 10 through the network, and may include a network interface. According to another example of the present exemplary embodiment, the image reception unit 21 may receive an image signal from the camera through a serial bus, and may include a serial bus protocol interface.

The storage management unit 23 manages data reading from the storage device 40 or data writing to the storage device 40. The storage management unit 23 reads data from the storage device 40 or records data in the storage device 40 according to the command of the controller 22.

According to an example of the present exemplary embodiment, when data is recorded in the storage device 40, the storage management unit 23 generates metadata for data and records the metadata together with the data in the storage device 40. According to another example, when data is recorded in the storage device 40, the storage management unit 23 obtains metadata from the controller 22 and records the obtained metadata together in the storage device 40. The metadata includes information on data, such as the location where the data is stored, the content of the data, information on the writer (e.g., a camera), the rights condition, the use condition, and the use history. The metadata may be used to search for data and may function as an index.

The storage management unit 23 may manage image signal reading from the storage device 40 or image signal writing to the storage device 40. According to an example, when an image signal is recorded in the storage device 40, the storage management unit 23 generates metadata for the image signal and records the metadata together with the data in the storage device 40. According to another example, when an image signal is recorded in the storage device 40, the storage management unit 23 obtains the metadata for the image signal from the controller 22 and records the metadata together with the data in the storage device 40.

The sub-system management unit 24 manages data transmission with a sub-system connected to the host system 20. The sub-system management unit 24 transmits data to the sub-system or obtains data from the sub-system, depending on the command of the controller 22. The sub-system management unit 24 may register a new sub-system and make a connection with the host system 20. Furthermore, the sub-system management unit 24 may release the connection between the host system 20 and the sub-system.

According to an exemplary embodiment, the sub-system management unit 24 transmits and receives data to and from the sub-system according to the PCI express (PCIe) standard. The sub-system management unit 24 may store and manage sub-system information.

The client management unit 25 manages data transmission with a client connected to the host system 20. The client management unit 25 transmits data to the client or obtains data from the client according to the command of the controller 22. The client management unit 25 may register a new client and make a connection with the host system 20. The client management unit 25 may release a connection of the client with the host system 20 according to the command of the controller 22. The client management unit 25 may transmit and receive data to and from the client through a network, and, as such, the client management unit 25 may include a network interface.

The client management unit 25 may transmit and receive data to and from the client through a network. The client management unit 25 may store and manage client information. For example, the client management unit 25 may restrict the number of clients connected to the host system 20.

Figure 5A:
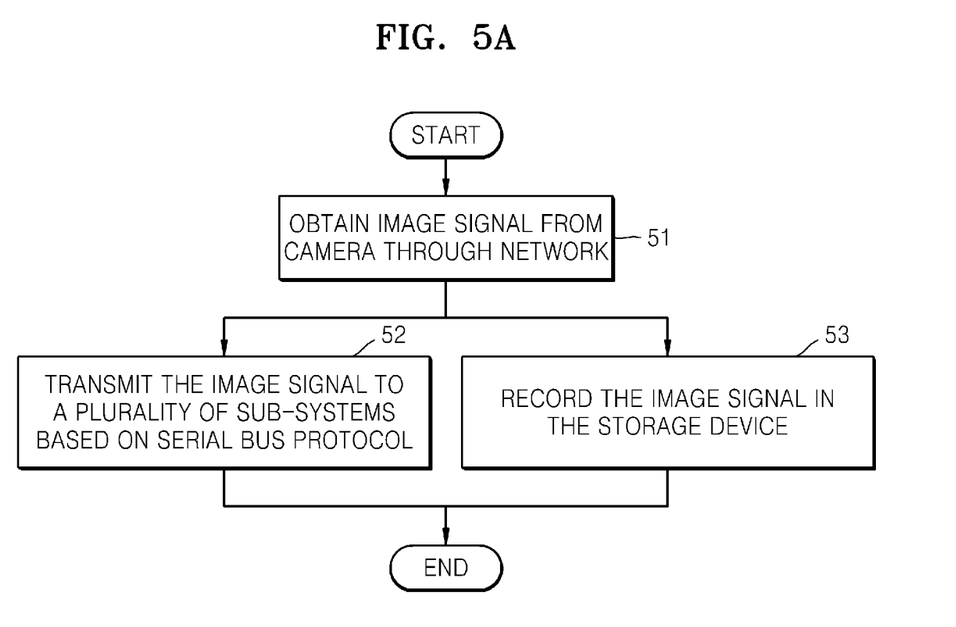
FIG. 5A is a flowchart illustrating a method of processing an image of a host system, according to an exemplary embodiment.

FIG. 5A is a flowchart illustrating a method of processing an image of a host system, according to an exemplary embodiment. Referring to FIG. 5A, in operation 51, the image reception unit 21 obtains an image signal from a camera through a network.

In operation 52, the sub-system management unit 24 transmits the image signal obtained in operation 51 to a plurality of sub-systems on the basis of a serial bus system. Each of the sub-systems includes a serial bus interface unit which receives or transmits data from the host system. For example, each of the sub-systems includes a PCI express (PCIe) interface unit.

For example, in operation 52, the sub-system management unit 24 transmits an image signal to the first sub-system 31. The first sub-system 31 may receive an image signal from the host system, decode the received image signal, and output the decoded image signal to the display device. The first sub-system 31 may transmit at least a part of the decoded image signal to the sub-system management unit 24. The sub-system management unit 24 transmits the obtained decoded image signal to the controller 22. The controller 22 may store the decoded image signal in the storage device 40 or transmit the decoded image signal to at least one of the sub-systems 30 or the client 50.

Furthermore, in operation 52, the sub-system management unit 24 transmits the image signal to the second sub-system 32. The second sub-system 32 may receive the image signal from the host system and analyze the received image signal so as to generate analysis data on the image signal. For example, the second sub-system 32 may detect an event from the image signal and generate event information.

In operation 53, the storage management unit 23 records the image signal obtained in operation 51 in the storage device 40. Operation 53 includes an operation of commanding the storage management unit 23 to perform an operation of reading data from the storage device 40 or writing data to the storage device 40, and an operation of generating, by the storage management unit 23, metadata for the data and recording the metadata for the data to the storage device 40 when the data is recorded in the storage device 40 according to the command.

Figure 5B:
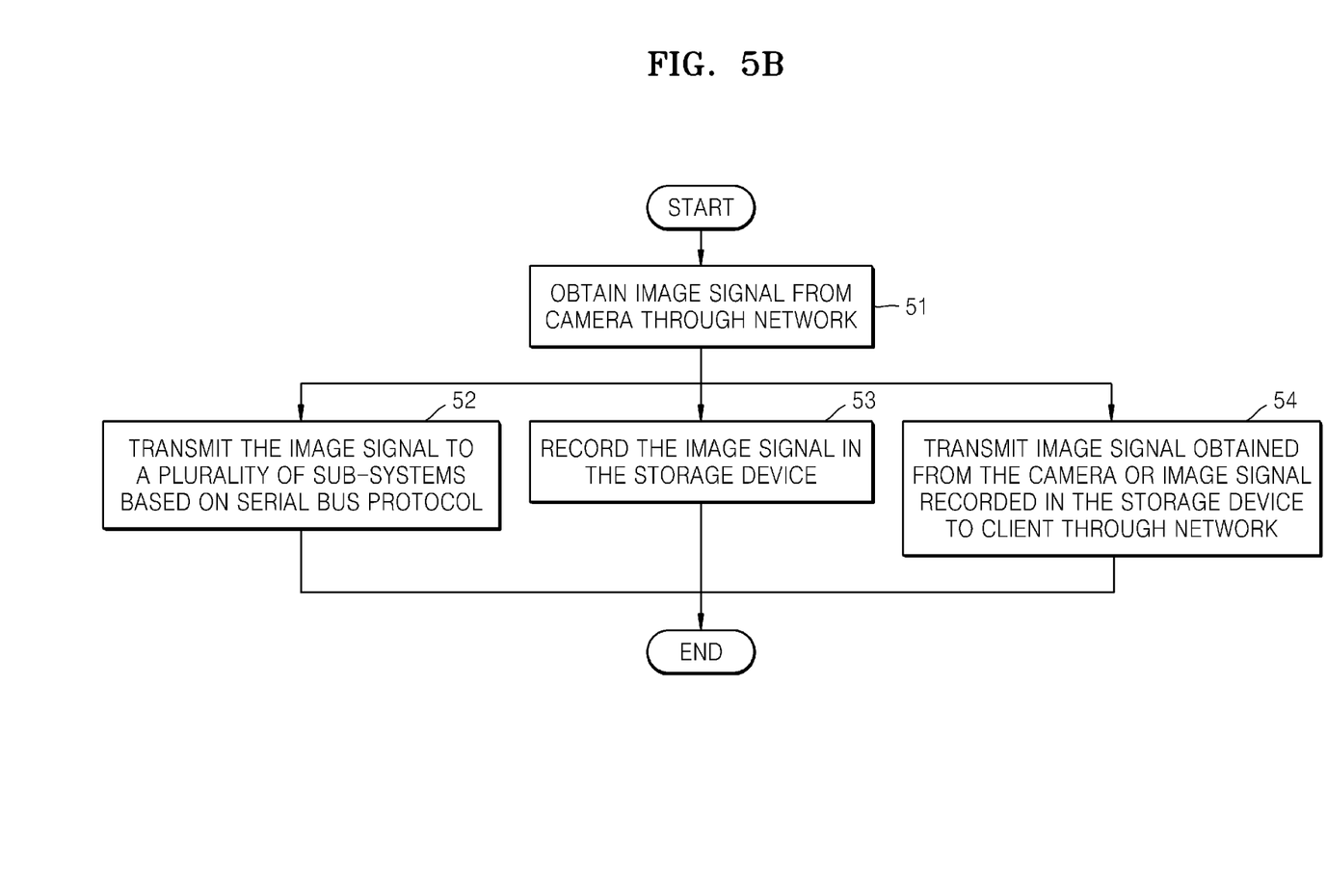
FIG. 5B is a flowchart illustrating a method of processing an image of a host system, according to another exemplary embodiment.

FIG. 5B is a flowchart illustrating a method of processing an image of a host system, according to another exemplary embodiment. In FIG. 5B, the operations having the same reference characters as the reference characters of operations shown in FIG. 5A may be the same operations, and accordingly, when describing FIG. 5B, the descriptions which overlap with those of FIG. 5A are omitted.

Referring to FIG. 5B, in operation 54, the client management unit 25 transmits an image signal obtained from the camera 10 or an image signal recorded in the storage device 40 to the client through the network.

According to an exemplary embodiment, flowcharts of FIGS. 5A and 5B include operations which are sequentially processed in the host system 20 illustrated in FIG. 4. Hence, the description with reference to FIGS. 1 to 4 may also applied to the flowcharts of FIGS. 5A and 5B.

Furthermore, referring to FIGS. 5A and 5B, the image processing method according to an exemplary embodiment may be written as a program which may be executed in a computer, and may be implemented in a general-purpose digital computer which operates the program using a computer-readable recording medium. The computer-readable recording medium includes storage media such as a magnetic recording medium (e.g., a ROM, a floppy disk, and a hard disk drive) and an optical reading medium (e.g., a CD-ROM and a DVD).

As described above, according to the one or more of the above exemplary embodiments, a video recording system according to an exemplary embodiment performs image processing operations such as decoding and the host system manages at least one sub-system, and thus, the data processing load of the host system is reduced. A high-speed stable communication may be performed by communication based on a serial bus protocol.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been shown and described with reference to the figures, it will be understood by those of ordinary skill in the art that various changes in form and details may be made therein without departing from the spirit and scope of the exemplary embodiments as defined by the following claims.

What is claimed is:

1. A video recording system comprising:
a camera configured to obtain an image signal;
a host system comprising a processor configured to control to receive the image signal from the camera through a network and transmit the image signal to an outside of the host system;
a first sub-system configured to receive the image signal from the host system, process the image signal using a signal processor included in the first sub-system, and transmit the processed image signal to the host system; and
a storage device configured to receive the processed image signal from the host system and record the processed image signal,
wherein each of the host system, the first sub-system and the storage device transmits or receives the image signal or the processed image signal using a serial bus protocol,
wherein the host system transmits the processed image signal to a second sub-system for an additional image processing,
wherein the host system, the first sub-system, and the second sub-system use different operating systems for the respective functions of receiving, processing, and transmitting the image signal or the processed image signal,
wherein the first sub-system is configured to receive the image signal from the host system, decode the image signal, transmit the decoded image signal to a display device, and transmit at least part of the decoded image signal to the host system, and
wherein the second sub-system is configured to receive the at least part of the decoded image signal from the host system, analyze the at least part of the decoded image signal to detect an event related to the image signal, and generate event information according to the detection of the event,
wherein the host system is further configured to receive a data transmission request message from a client and transmit the image signal received from the camera or the processed image signal to the client, and
wherein the host system is further configured to control a registration of a new sub-system and control a release of a connection between the host system and the first and second sub-systems.

2. The video recording system of claim 1, wherein the serial bus protocol comprises a peripheral component interconnect express (PCIe) serial bus protocol.

3. The video recording system of claim 1, wherein the host system is configured to store the decoded image signal in the storage device or transmit the decoded image signal to the second sub-system.

4. The video recording system of claim 1, wherein the host system comprises a storage management unit configured to read data from the storage device or record data to the storage device according to a command of the host system, and
wherein, when data is recorded in the storage device, the storage management unit is configured to generate metadata for the data and record the metadata in the storage device.

5. A method of processing an image using a host system, the method comprising:
obtaining, at the host system, an image signal from a camera through a network;

transmitting the image signal from the host system to a first sub-system for processing the image signal at the first sub-system;

receiving, at the host system, the processed image signal from the first sub-system; and transmitting the processed image signal from the host system to a storage device, and recording the processed image signal in the storage device, wherein each of the host system, the sub-systems and the storage device transmits or receives the image signal or the processed image signal using a serial bus protocol, wherein the method further comprises transmitting the processed image signal from the host system to a second sub-system for an additional image processing, wherein the host system, the first sub-system, and the second sub-system use different operating systems for the respective functions of receiving, processing, and transmitting the image signal or the processed image signal, wherein the processed image signal is a decoded image signal which is decoded at the first subsystem, wherein the first subsystem outputs the decoded image signal to a display device, and transmits at least part of the decoded image signal to the host system, wherein the transmitting the processed image signal from the host system to the second sub-system comprises transmitting the at least part of the decoded image signal from the host system to the second sub-system, and wherein the second sub-system analyzes the at least part of the decoded image signal to detect an event related to the image signal, and generates event information according to the detecting of the event, wherein the host system receives a data transmission request message from a client and transmits the image signal received from the camera or the processed image signal to the client, and wherein the host system controls a registration of a new sub-system and controls a release of a connection between the host system and the first and second sub-systems.

6. The method of claim 5, wherein the serial bus protocol comprises a peripheral component interconnect express (PCIe) serial bus protocol.

7. The method of claim 5, further comprising:
storing the processed image signal received from the first sub-system in the storage device or transmitting the processed image signal to at least one of the plurality of sub-systems.

8. The method of claim 5, wherein the recording comprises:
reading data from the storage device or writing data to the storage device; and
generating metadata for the data and recording the metadata in the storage device according to whether data is recorded in the storage device according to a command.

9. A host system of a video recording system, the host system comprising:
an image receiver configured to receive an image signal from a camera through a network;
a sub-system manager configured to transmit the image signal to at least one sub-system based on a serial bus protocol so that the image signal is processed at the sub-system, and receive the processed image signal from the sub-system;
a storage manager configured to transmit the processed image signal to a storage and record the processed image signal in a storage;
a client manager configured to transmit the image signal to a client through a network; and
a controller configured to control the image receiver, the sub-system manager, the storage manager, and the client manager, wherein each of the host system, the sub-system and the storage transmits or receives the image signal or the processed image signal using a serial bus protocol, wherein the sub-system manager transmits the processed image signal to another sub-system for an additional image processing, wherein the host system, the sub-system, and the other sub-system use different operating systems for the respective functions of receiving, processing, and transmitting the image signal or the processed image signal, wherein the sub-system is configured to receive the image signal from the host system, decode the image signal, transmit the decoded image signal to a display device, and transmit at least part of the decoded image signal to the host system, and wherein the other sub-system is configured to receive the at least part of the decoded image signal from the host system, analyze the at least part of the decoded image signal to detect an event related to the image signal, and generate event information according the detection of the event, wherein the client manager is configured to receive a data transmission request message from the client and transmit the image signal received from the camera or the processed image signal to the client, and wherein the host system is configured to control a registration of a new sub-system and control a release of a connection between the host system and the at least one sub-system.

10. A video recording system, comprising:
a host system configured to receive an image signal from a camera through a network, the host system comprising a first processor configured to perform a first processing operation on the image signal, and transmit out the image signal on which the first processing operation is performed; and a sub-system configured to communicate with the host system via a peripheral component interconnect express (PCIe) protocol to receive the image signal, on which the first processing operation is performed, transmitted from the host system, the sub-system comprising a second processor configured to perform a second processing operation on the image signal received from the host system, and transmit to the host system the image signal on which the second processing operation is performed, wherein the first and second processors are configured to independently perform the first and second processing operations, respectively, wherein the first processor is further configured to transmit the image signal received from the sub-system to a storage device, wherein each of the host system, the sub-system and the storage device transmits or receives the image signal or the image signal on which the first or second processing operation is performed, using a serial bus protocol, wherein the first processor is further configured to transmit the image signal, on which the second processing operation is performed, received from the sub-system to another sub-system for an additional image processing, and wherein the host system, the sub-system, and the other sub-system use different operating systems for the respective functions of receiving, processing, and transmitting the image signal or the image signal on which the first or second processing operation is performed, wherein the sub-system is configured to receive the image signal from the host system, decode the image signal, transmit the decoded image signal to a display device, and transmit at least part of the decoded image signal to the host system, and wherein the other sub-system is configured to receive the at least part of the decoded image signal from the host system, analyze the at least part of the decoded image signal to detect an event related to the image signal, and generate event information according the detection of the event, wherein the host system is configured to receive a data transmission request message from a client and transmit the image signal received from the camera or the image signal received from the sub-system to the client, wherein the host system is configured to control a registration of a new sub-system and control a release of a connection between the host system and at least one existing sub-system.

11. The video recording system of claim 10, wherein the image signal transmitted from the host system to the sub-system is encoded, and the second processing operation comprises decoding the encoded image signal.

12. The video recording system of claim 10, wherein the second processing operation comprises analyzing the image signal, on which the first processing operation is performed, to determine whether a predetermined event has occurred.

* * * * *